May 23, 1950  A. A. BERG  2,508,934
LIFTING JACK
Filed March 14, 1946
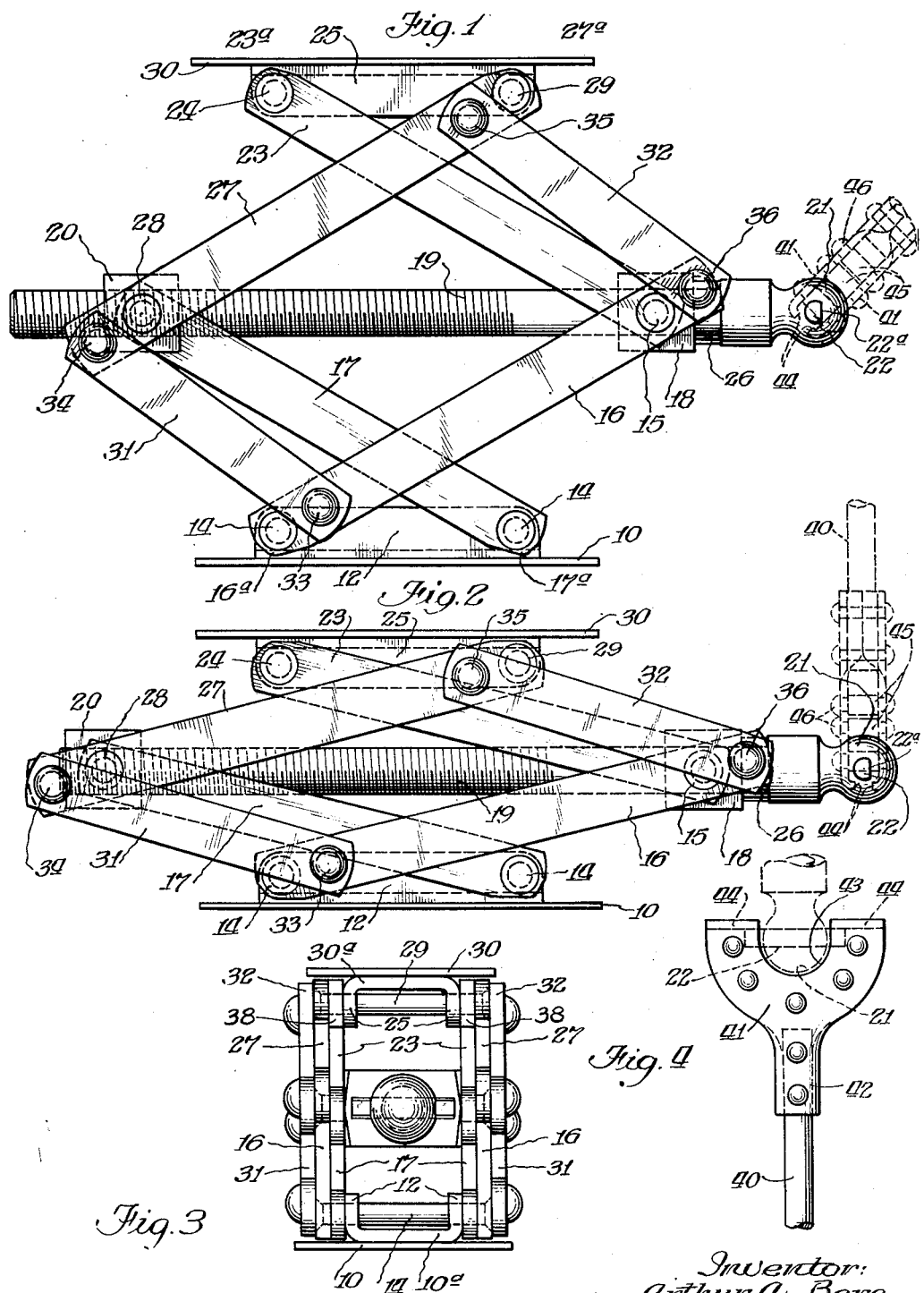
Inventor:
Arthur A. Berg.
By: Burton & Burton
Attorney.

Patented May 23, 1950

2,508,934

UNITED STATES PATENT OFFICE 2,508,934

LIFTING JACK

Arthur A. Berg, Chicago, Ill.

Application March 14, 1946, Serial No. 654,382

1 Claim. (Cl. 254—126)

This invention relates to a lifting jack especially adapted for use with automobiles and motor trucks in connection with the repair of tires and for making other adjustments.

One object of the invention is to provide a simple and economical structure adapted for manufacture by mass production methods.

Another object of the invention is to provide a lifting jack employing links in a parallelogrammatic arrangement and provided with stabilizing means for holding the upper and lower platform or support elements in parallel relation.

It is also an object of the invention to provide a jack of the parallelogram type having an adjusting screw and provided with stabilizing links connected to extensions of the operating links of the jack and adapted to hold the lower and upper platform or supporting members in vertical alignment, or substantially so.

Other objects and advantages of the invention will appear from the following description taken in connection with the drawings, in which:

Fig. 1 is a side elevation of a jack embodying this invention, showing the parts partially extended in lifting position;

Fig. 2 is a similar side elevation showing the parts fully collapsed at the lower limit;

Fig. 3 is an end elevation of the structure as it appears in the position shown in Fig. 2;

Fig. 4 is a detail view of an operating handle.

In providing a jack for use with automobiles or motor trucks, it is not only important to provide for adequate extension of the structure but also to insure that it can be collapsed to a position at which it can be easily installed under the axle of a vehicle of modern design in which relatively small wheels are employed and in which the tires constitute such a large proportion of the wheel diameter that when the tire is collapsed, as in the event of a blowout or puncture, the axle is brought quite close to the road surface. Although the parallelogram system of links employed in the jack of the present invention permits of a fairly compact collapsed position of the structure, the invention includes the special formation and design of the link members by which a minimum vertical height is assured when the parts are adjusted at their lower limit.

As shown in the drawings, the jack includes a support or base 10 having upright flanges 12 spaced apart laterally and providing support for the pivots 14, 14 by which two pairs of links 16, 16 and 17, 17 are connected to the base. Said links extend obliquely upward and cross each other, as shown in Fig. 1, and near their upper ends the links 16 are pivoted at 15 to a block 18 which is journalled upon an operating screw 19. The upper ends of the links 17 are pivoted to a block 20 having threads by which it engages the screw 19 for longitudinal adjustment thereon. The screw 19 is provided with a head 21 which is preferably of spherical form and includes a cross bar 22 for connection with a suitable operating crank, not shown.

Extending upwardly from the block 18 is a pair of links 23, 23, pivotally connected at 24 to the flanges 25 of the upper platform 30. Another pair of links 27, 27 are pivoted at 28 to the threaded block 20 and their opposite ends are pivoted at 29, 29 to the flanges 25 of the platform 30.

This arrangement of links 16, 17, 23, and 27 constitutes the parallelogram system which operates to raise and lower the platform 30 when the screw 19 is rotated. Preferably, a suitable anti-friction washer or bearing 26 is interposed between the shoulder of the head 21 and the shoulder of the block 18, said block forming a journal bearing for the shank of the screw 19 in which it is rotated for adjusting the height of the platform 30.

To stabilize the structure, however, so that the platform 30 shall remain always directly over the base 10, and also parallel thereto, the device includes two pairs of stabilizing links 31, 31 and 32, 32. The links 31, 31 are connected respectively to the lifting links 16 by pivots 33 disposed adjacent the pivots 14 by which the links 16 are attached to the base 10. At their opposite ends the stabilizing links 31 are connected to portions of the links 27, 27 which extend beyond their pivotal engagement at 28 with the threaded block 20, and pivots 34, 34 serve to connect the ends of the links 31 with these extensions of the links 27. Similarly, the links 32, 32 are connected respectively to the links 27, 27 by means of pivots 35, 35 near their pivots 29, 29 which connect said links 27 to the upper platform 30. The opposite ends of the links 32, 32 are connected by pivots 36 to extensions of the links 16, 16 beyond their pivotal connections at 15 to the block 18 on the shank of the screw 19.

It will be seen from Fig. 1 that at any position of its upward extension, the provision of the stabilizing links 31 and 32 prevents the platform 30 from tilting out of its parallel position with respect to the supporting base 10 so that as the screw 19 is rotated and throughout the range of vertical movement of the platform 30, the platform will remain substantially above the support 10 and parallel to it.

Fig. 3 indicates a convenient manufacturing design for the jack in which the base 10 is provided with a channel or U-shaped member 10a which includes the upstanding flanges 12, 12 in which the pivots 14, 14 are secured. Similarly, the platform member 30 is provided with a channel shaped member 30a having the integral flanges 25, 25 in which the pivots 29 and 24 are secured for anchoring the links 23 and 27. The link members 23, 23 are secured against the outer faces of the flanges 25, 25 and the link members 27, 27 overlap the members 23, 23 as indicated in Figs. 1 and 3, being spaced from the flanges 25, 25 by suitable washers 38, 38. The stabilizing links 32, 32 are disposed outside the other links of the assembly as indicated in Fig. 3. Similarly, the lower links 16, 17 and 31 are arranged in overlapped relation as shown in Fig. 3.

When the screw 19 is rotated in one direction, the threaded block 20 is caused to approach the journal block 18, forcing the links 16 and 17 to swing upwardly and also forcing the lower ends of the links 23 and 27 to approach so as to lift the platform 30 in a well-understood manner. As the platform rises, it is prevented from tilting by means of the stabilizing links 31 and 32 and the platform therefore is maintained in parallel relation to the base 10. In view of the substantially symmetrical arrangement of the links 16, 17, 23, and 27, the platform 30 is maintained in a position substantially above the base 10 throughout its range of vertical movement.

To permit rotative movement of the links 16 and 17 about their pivots 14, without interference with the base plate 10 of the structure, the lower edges and corners of the links 16 and 17 are trimmed at 16a and 17a, thus permitting said links 16 and 17 to swing downwardly to a greater extent than would be possible if their corners were left square as at the upper sides of the links. Similarly, the upper corners 23a and 27a of the links 23 and 27 are shaped to avoid interference with the platform member 30 as the jack is collapsed to its lower limit, as shown in Fig. 2. Thus while the pivots 14, 24, and 29 are disposed substantially along the center lines of the links 16, 17, 23, and 27, said links may be swung through greater angles than if their corner portions were not thus cut off or rounded, and as a result the jack can be collapsed to a smaller minimum height as indicated in Fig. 2, without any sacrifice of strength or convenience of operation.

Preferably, the operating handle for rotating the screw 19 is made readily detachable from the spherically formed terminal portion 21 of the screw. A portion of such an operating handle is shown in Fig. 4 at 40, it being understood that one end of the handle may be provided with a crossbar or other convenient means for rotating it. The other end has secured to it rigidly, as by rivets, a pair of plates 41 formed at 42 to fit the curved form of the handle 40. Both plates have arcuate notches 43 in their opposite ends, said notches being dimensioned to approximately fit the curvature of the terminal 21 so as to embrace it, as shown in Fig. 4. In this position the plates 41 will overlap the projecting ends of the cross pin 22 in the terminal 21 so as to provide a driving engagement for rotating the screw 19. Both plates have in-turned terminal flanges 44 which are spaced apart by something less than the full diameter of the pin 22 so as to retain the handle in driving position on the terminal 21.

The projecting portions of the pin 22 are each flattened at one side as shown at 22a so that when the handle is swung to extend at right angles to the screw 19, as seen in dotted outline in Fig. 2, the smaller dimension of the pin 22 will pass between the opposing flanges 44 so as to permit disconnection of the handle when the jack is out of service.

While there is shown and described herein certain structure illustrating and embodying the invention, it will be understood that various changes and modifications will occur to those skilled in the art and may be made without departing from the spirit of the invention, and it is the intention to cover within the scope of the appended claims all such alterations and all equivalents which may be substituted for the features which are herein disclosed. For example, if desired, the screw 19 may be formed with right and left hand threads, and both the blocks 18 and 20 may be threaded to respectively engage the right and left hand threads of the member 19 so that both blocks will travel on said member when it is rotated. It also may be understood that the provision of the channel members 10a and 30a is merely a preferred expedient to provide means for attaching the links to the base and to the platform and that connecting lugs for the pivots 14, 24, and 29 may be otherwise secured to the base and to the platform if desired.

I claim:

A jack comprising a base, two lower pairs of lifting links pivoted at their lower ends to said base, the links of one pair crossing those of the other pair, a screw, two blocks mounted on the screw and pivotally connected to said pairs of lifting links respectively, each link of one pair of said lower links including an extended portion projecting beyond the point of pivotal connection of said links with one of said blocks, two upper pairs of lifting links pivoted at their lower ends to said blocks respectively, a platform, said upper links being pivoted at their upper ends to said platform, one pair of said upper links crossing the other pair, each link of one pair of said upper links including an extended portion projecting beyond the point of pivotal connection of said links with the other of said blocks, and a pair of stabilizing members each pivoted at one end to the extended portion of one of said lifting links, respectively, at a point beyond the pivotal connection of said link to the block, and pivoted at the other end to another lifting link at a point intermediate the pivoted ends of said link and adjacent to the end thereof which is remote from the screw, the eccentricity of the pivotal connections between the respective stabilizing members and the lifting links to which they are connected being equal and opposite with respect to the axis of the screw and with respect to the axis of movement of the platform with respect to the base.

ARTHUR A. BERG.

REFERENCES CITED

The following references are of record in the file of this patent:

UNITED STATES PATENTS

| Number | Name | Date |
|---|---|---|
| 1,429,940 | Field | Sept. 26, 1922 |
| 1,513,862 | Riker | Nov. 4, 1922 |
| 1,954,558 | Conrad | Apr. 10, 1934 |